(12) United States Patent
Lim (10) Patent No.: US 12,067,552 B2
(45) Date of Patent: Aug. 20, 2024

(54) METHOD OF ISSUING ELECTRONIC RECEIPTS

(71) Applicant: PI-XCELS CO., LTD., Seongnam-si (KR)

(72) Inventor: Daniel Ching Luen Lim, Singapore (SG)

(73) Assignee: PI-XCELS PTE. LTD., Singapore (SG)

( * ) Notice: Subject to any disclaimer, the term of this patent is extended or adjusted under 35 U.S.C. 154(b) by 0 days.

(21) Appl. No.: 18/001,390

(22) PCT Filed: Sep. 29, 2022

(86) PCT No.: PCT/KR2022/014622
§ 371 (c)(1),
(2) Date: Dec. 9, 2022

(87) PCT Pub. No.: WO2023/136424
PCT Pub. Date: Jul. 20, 2023

(65) Prior Publication Data
US 2023/0222476 A1    Jul. 13, 2023

(30) Foreign Application Priority Data

Jan. 11, 2022 (KR) .................. 10-2022-0003963
Mar. 25, 2022 (KR) .................. 10-2022-0037255

(51) Int. Cl.
G06Q 20/38        (2012.01)
G06Q 20/20        (2012.01)
G06Q 20/32        (2012.01)

(52) U.S. Cl.
CPC ....... *G06Q 20/209* (2013.01); *G06Q 20/3278* (2013.01); *G06Q 20/3827* (2013.01); *G06Q 2220/00* (2013.01)

(58) Field of Classification Search
CPC ............ G06Q 20/3278; G06Q 20/209; G06Q 20/3821
See application file for complete search history.

(56) References Cited

U.S. PATENT DOCUMENTS 9,009,071 B1      4/2015 Watson et al.
11,157,954 B1 *  10/2021 Belanger ............ G06Q 30/0201
(Continued)

FOREIGN PATENT DOCUMENTS

CN    108416582 A  *  8/2018  ............. G06F 21/35
EP        3043304 A1      7/2016
(Continued)

OTHER PUBLICATIONS

Venkatesh et al., An NFC based innovation for paperless retail transactions and digital receipts management, 2015 Annual IEEE India Conference (INDICON), 2015, p. 1-6.*
(Continued)

*Primary Examiner* — Ilse I Immanuel
(74) *Attorney, Agent, or Firm* — Smart & Biggar LP (57) ABSTRACT

Provided is a method of issuing an electronic receipt, which enables a user to conveniently check an electronic receipt through a smartphone. The method of issuing an electronic receipt includes receiving, by an electronic receipt generator, information regarding a transaction from a point of sale (POS) terminal, generating an address corresponding to the information, and storing transaction information in a server corresponding to the address; transmitting the generated address to a user device through a near-field wireless communication technology; and displaying, by the user device, an electronic receipt through the transmitted address.

1 Claim, 9 Drawing Sheets

(56) References Cited

U.S. PATENT DOCUMENTS

| | | | |
|---|---|---|---|
| 2012/0203644 A1 | 8/2012 | Phillips | |
| 2013/0112743 A1 | 5/2013 | Cavin et al. | |
| 2014/0025517 A1 | 1/2014 | Argue et al. | |
| 2014/0040052 A1 | 2/2014 | Arthur et al. | |
| 2015/0025986 A1* | 1/2015 | Patel | G06Q 20/384 705/16 |
| 2015/0363889 A1 | 12/2015 | Marian et al. | |
| 2018/0285858 A1 | 10/2018 | Pavageau et al. | |
| 2019/0095897 A1 | 3/2019 | Miyata | |
| 2019/0354949 A1 | 11/2019 | Watanabe | |

FOREIGN PATENT DOCUMENTS

| | | |
|---|---|---|
| FR | 2969345 A1 | 6/2012 |
| JP | 2019125270 | 7/2019 |
| KR | 20130013941 A | 2/2013 |
| KR | 20150009396 | 1/2015 |
| KR | 20150031608 A | 3/2015 |
| KR | 20170024269 | 3/2017 |
| KR | 101773924 B1 | 9/2017 |
| KR | 102444679 B1 * | 9/2022 |
| KR | 102444679 B1 | 9/2022 |
| WO | 2014/008061 A1 | 1/2014 |

OTHER PUBLICATIONS

International Search Report and Written Opinion and English Translation dated Jan. 3, 2023, PCT/KR2022/014622.

International Search Report and Written Opinion dated Apr. 18, 2023, PCT/IB2023/050226.

Preliminary Examination Interview Report (with English Translation), Korean Patent Application No. 10-2020-0037255, May 20, 2022.

Examiner's Report (with English Translation) dated Mar. 25, 2022, KR Application No. 10-2022-0037255.

Notice of Allowance (with English Translation) dated Sep. 8, 2022, KR Application No. 10-2022-0037255.

European Search Report and Opinion of corresponding EP Application No. 22879559.7 dated Jun. 10, 2024.

* cited by examiner

METHOD OF ISSUING ELECTRONIC RECEIPTS

CROSS-REFERENCE TO RELATED APPLICATIONS

This application is a U.S. nationalization under 35 U.S.C. § 371 of International Application No. PCT/KR2022/014622 filed Sep. 29, 2022, which claims the benefit of Korean patent application 10-2022-0037255 filed Mar. 25, 2022, which claims the benefit of Korean patent application 10-2022-0003963 filed Jan. 11, 2022. International Application No. PCT/KR2022/014622 also claims the benefit of Korean patent application 10-2022-0003963. The entire contents of all of these documents are incorporated herein by reference.

TECHNICAL FIELD

The present disclosure relates to a method of issuing electronic receipts, such that a user may conveniently check the same on a smartphone.

BACKGROUND ART

When a consumer completes a transaction associated with the purchase of goods or use of a service, the consumer receives a receipt. In general, a point of sale (POS) terminal issues a paper receipt regarding the details of a transaction through a receipt printer. However, from the perspective of a consumer, it is difficult to efficiently manage paper receipts, and there is a risk of personal information leakage. Also, from the perspective of a business operator, a separate management cost is incurred due to the printing of paper receipts.

DETAILED DESCRIPTION OF THE INVENTION

Technical Problem

The present disclosure provides a method of issuing electronic receipts, such that a user may conveniently check the same on a smartphone. The technical objects to be achieved by one or more embodiments are not limited to the technical objects as described above, and other technical problems may be inferred from the following embodiments.

Technical Solution to Problem

According to an embodiment of the present invention, a method of issuing an electronic receipt (e-receipt), the method includes receiving transaction information related to a transaction, generating an address corresponding to the transaction information, storing the transaction information in a server in response to the address, transmitting the generated address to a user device through wireless communication technology, and displaying, by the user device, an e-receipt generated in response to the transaction information through the transmitted address.

Here, the transaction information is generated after the transaction is completed.

Here, the transaction information is generated before the transaction is completed.

Here, the method further includes, after the user device receives the address, receiving, by the user device, transaction information generated after the transaction is completed, updating the transaction information generated after the transaction is completed to a server in correspondence to the address, and displaying a final e-receipt generated in correspondence to the transaction information generated after the transaction is completed.

Here, the address is uniquely generated in correspondence to the transaction information.

Here, the address is uniquely generated in correspondence to the transaction information by including a unique identifier.

Here, the address is a uniform resource locator (URL) linking a web page.

Here, in the transmitting of the generated address through the near-field wireless communication technology, the generated address is transmitted to the user device through a near-field communication (NFC) data exchange format (NDEF) message including a payload.

Here, the address is a deep link URL that links an app page.

Other aspects, features, and advantages will become apparent from the following drawings, claims, and detailed description of the present disclosure.

These general and specific aspects may be practiced using systems, methods, computer programs, or any combination of systems, methods, and computer programs.

Advantageous Effects of Disclosure

According to embodiments of the present invention, a user may check an e-receipt through a browser without installing a separate application on a smartphone.

BEST MODE

According to an embodiment of the present invention, a method of issuing an electronic receipt (e-receipt), the method includes receiving transaction information related to a transaction, generating an address corresponding to the transaction information, storing the transaction information in a server in response to the address, transmitting the generated address to a user device through wireless communication technology, and displaying, by the user device, an e-receipt generated in response to the transaction information through the transmitted address.

Mode of Disclosure

Since the present disclosure can apply various transformations and can have various embodiments, specific embodiments are illustrated in the drawings and described in detail in the detailed description. However, this is not intended to limit the present disclosure to particular modes of practice, and it is to be appreciated that all changes, equivalents, and substitutes that do not depart from the spirit and technical scope of the inventive concept are encompassed in the present disclosure. In the description of the present disclosure, certain detailed explanations of the related art are omitted when it is deemed that they may unnecessarily obscure the essence of the present disclosure.

Figure 1:
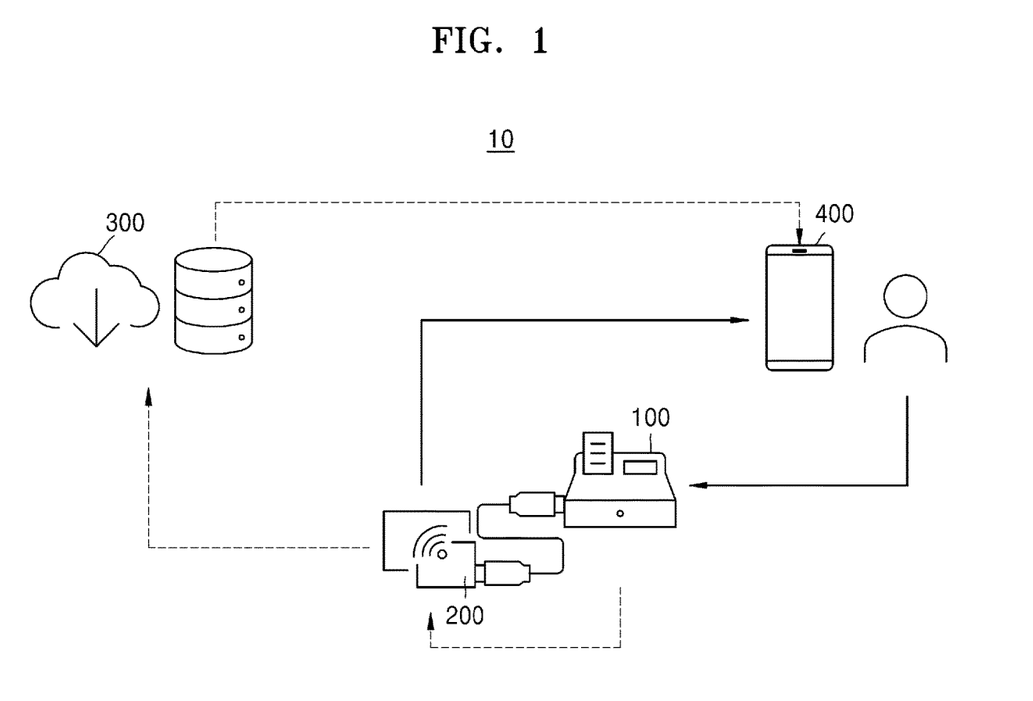
FIG. 1 is a conceptual diagram showing an electronic receipt (e-receipt) issuing system according to an embodiment of the present invention.

FIG. 1 is a diagram showing an electronic receipt (e-receipt) issuing system 10 according to an embodiment of the present invention. Referring to FIG. 1, the e-receipt issuing system 10 according to an embodiment of the present disclosure includes a Point of Sale (POS) terminal 100, an e-receipt generator 200, a server 300, and a user device 400.

The POS terminal 100 is a device that processes a transaction according to purchase of goods or use of a service, checks a result thereof, and manages information related to the transaction.

The POS terminal 100 includes a card reader, a barcode reader, a paper receipt printer, etc., and may be implemented in various devices in addition to a computer or a mobile device. The POS terminal 100 referred to in the present disclosure collectively refers to devices for handling transaction-related information and includes all devices that perform similar functions, such as a point of purchase (POP) terminal and a kiosk.

The POS terminal 100 and the e-receipt generator 200 may transmit and receive data through a communication system. For example, the communication system may include a wired communication system through a Universal Serial Bus (USB) cable or a wireless communication system such as Wi-Fi or Bluetooth. However, the present disclosure is not limited thereto.

Although FIG. 1 shows that the POS terminal 100 is a single device, the present disclosure is not limited thereto, and the POS terminal 100 may include a plurality of devices connected to the e-receipt generator 200.

The e-receipt generator 200 is a medium that allows a consumer to check an e-receipt with a smartphone. The e-receipt generator 200 transmits or exchanges data to or with the user device 400 by using near-field wireless connectivity technologies. According to an embodiment, the e-receipt generator 200 may include a Near-Field Communication (NFC) tag to use an NFC standard. However, the present disclosure is not limited thereto, and the e-receipt generator 200 may use standards like Bluetooth, Radio Frequency Identification (RFID), Magnetic Secure Transmission (MST), Beacon, Zigbee, etc.

The e-receipt generator 200 communicates with the server 300 through a communication network (not shown). At this time, the communication network may be the Internet, such that the e-receipt generator 200 may access the server 300 and transmit and receive data. However, the present disclosure is not limited thereto. The e-receipt generator 200 may access the server 300 by connecting to the Internet through Wi-Fi, but the present disclosure is not limited thereto.

The server 300 may be a dedicated server or a cloud server. However, the present disclosure is not limited thereto, and various types of servers may be applied.

The server 300 is connected to the e-receipt generator 200 through a communication network (not shown), receives data from the e-receipt generator 200, and stores the data in a database. Also, the server 300 is connected to the user device 400 through a communication network (not shown) and transmits data to the user device 400. Here, the communication network may be the Internet, but the present disclosure is not limited thereto. The user device 400 may access the server 300 by accessing the Internet through Wi-Fi or a mobile network, but the present disclosure is not limited thereto.

The user device 400 is a device through which a user, who is the subject of a transaction, may check an e-receipt. The user device 400 may include a smartphone, a smart watch, a smart device, a personal digital assistant (PDA), a wireless communication terminal, etc. However, the present disclosure is not limited thereto.

The user device 400 is a device that supports near-field wireless connectivity technologies to wirelessly communicate with the e-receipt generator 200 in a short distance. According to an embodiment, the user device 400 may support the NFC standard. However, the present disclosure is not limited thereto, and the user device 400 may support standards such as Bluetooth, Radio Frequency Identification (RFID), Magnetic Secure Transmission (MST), Beacon, Zigbee, etc.

Figure 2:
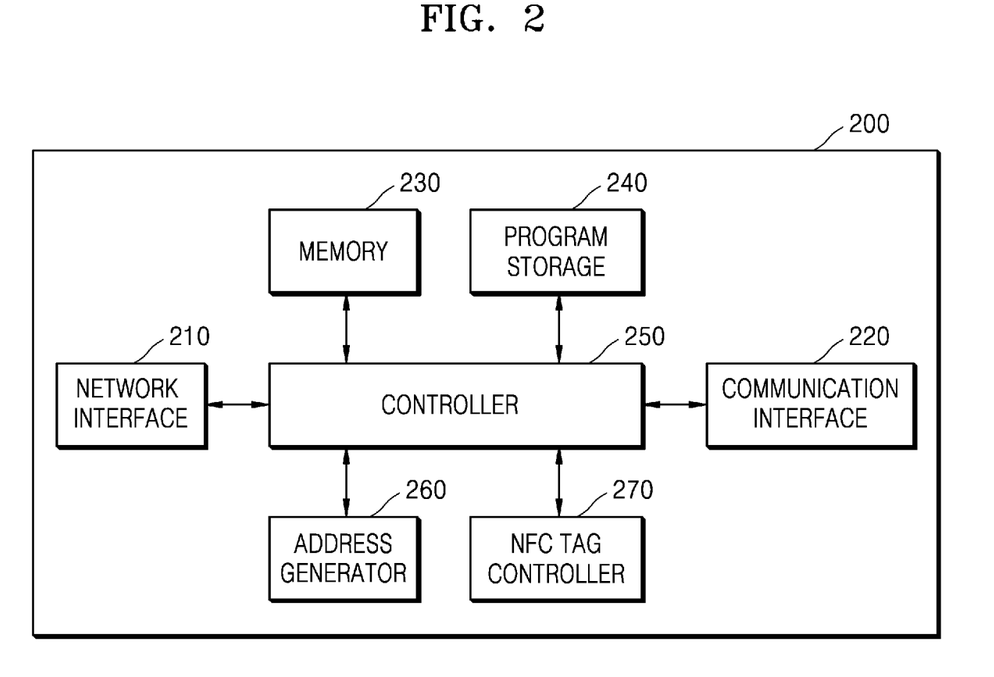
FIG. 2 is a block diagram showing an example of the internal configuration of an e-receipt generator shown in FIG. 1.

FIG. 2 is a block diagram showing an example of the internal configuration of the e-receipt generator 200 shown in FIG. 1.

Referring to FIG. 2, the e-receipt generator 200 includes a network interface 210, a communication interface 220, a memory 230, a program storage 240, a controller 250, an address generator 260, an NFC tag controller 270, etc.

The network interface 210 provides an interface needed for transmitting an address and transaction information corresponding thereto to a server, in conjunction with a communication network.

The communication interface 220 provides an interface needed for receiving transaction information from the POS terminal 100, in conjunction with a communication system.

The memory 230 temporarily stores data processed by the controller 250 or temporarily stores transaction information transmitted to the e-receipt generator 200.

The program storage 240 stores therein control software for performing a task of transmitting data to the server 300, a task of receiving data from the POS terminal 100, a task of generating an address corresponding to transaction information, a task of generating a message corresponding to an address and programming the message to an NFC tag, etc.

The controller 250 is a kind of central processing unit and controls the entire process related to generation of an e-receipt in the e-receipt generator 200. In other words, the controller 250 performs various services such as driving control software stored in the program storage 240.

The address generator 260 generates a unique address in correspondence to received transaction information. Here, an address refers to a Uniform Resource Locator (URL) for accessing a web site or a web page on the Internet, but the present disclosure is not limited thereto.

The address generator 260 generates a unique address by including a unique identifier corresponding to transaction information in an address. For example, an address may have the format "web address/identifier." Here, the format of the identifier may have various lengths based on a combination of letters, numbers, and special characters, but the present disclosure is not limited thereto.

According to an embodiment, the e-receipt generator 200 may generate an identifier based on contents related to transaction information. For example, an identifier may be generated based on information regarding the e-receipt generator 200 and a date and a time that transaction information is generated. According to another embodiment, the e-receipt generator 200 may generate an identifier using a hash technique. Here, the hash technique refers to a technique for obtaining one result value corresponding to one input value through a hash function. In this case, an identifier may be a result value obtained through the hash technique using transaction information as an input value. However, methods of generating an identifier according to the present disclosure are not limited thereto.

The NFC tag controller 270 generates a message corresponding to an address and emits the message as a near-field wireless communication signal by controlling an NFC tag. According to an embodiment, a message may be in a particular format used for near-field wireless communication. Here, the particular format refers to a format that enables the user device 400 receiving a corresponding message to immediately perform a predetermined action. For example, the NFC tag controller 270 generates and emits an NFC Data Exchange Format (NDEF) message. An NDEF message includes information be transmitted to the user device 400. Here, as a payload, an address is included in the NDEF message. Thereafter, the user device 400 performs a predetermined operation by receiving the NDEF message. Here, the predetermined operation may be to open a web page, which is linked to an address, through a browser.

From among the above-stated components, two or more functionally connected components may be combined with each other and exist as a single component or one component may be divided into a plurality of components according to functions. Meanwhile, in order for each of components to operate efficiently, other components may be further included or already existing components may be excluded. Also, the names of components are determined according to their roles for convenience and may be named variously without being limited thereto.

Figure 3:
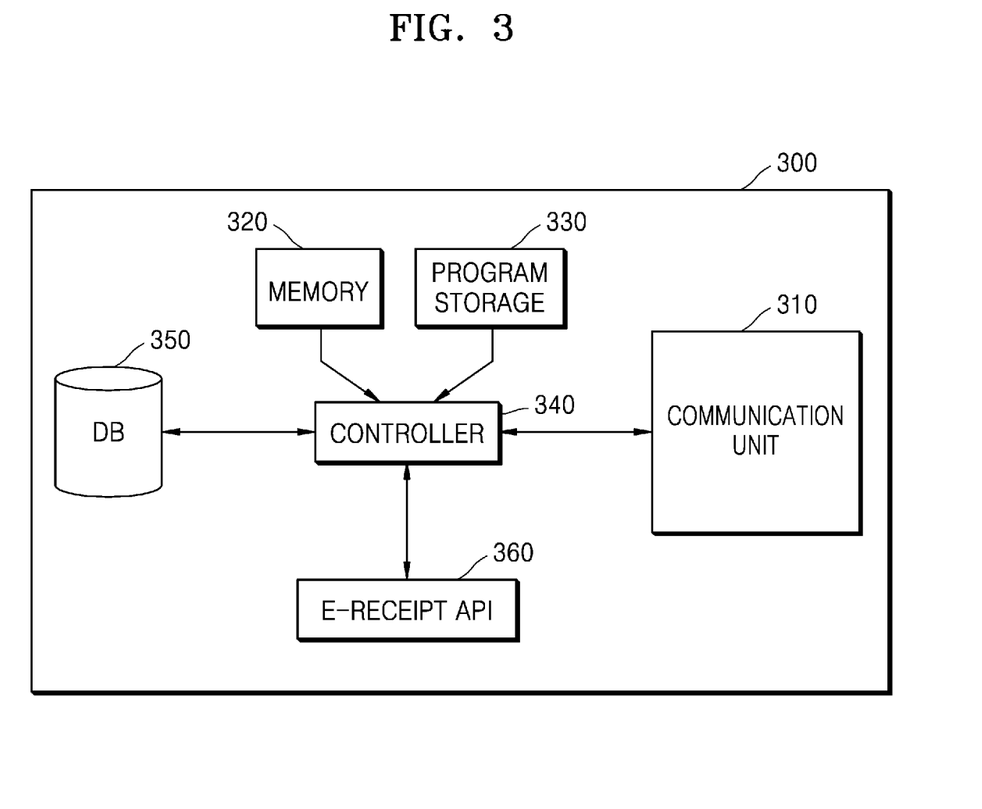
FIG. 3 is a block diagram showing an example of an internal configuration of a server shown in FIG. 1.

FIG. 3 is a block diagram showing an example of an internal configuration of the server 300 shown in FIG. 1.

Referring to FIG. 3, the server 300 may include a communication unit 310, a memory 320, a program storage 330, a controller 340, a database 350, and an e-receipt application programming interface (API) 360.

The communication unit 310 provides an interface needed for providing signals transmitted and received between the server 300 and the user device 400 and between the server 300 and the e-receipt generator 200 in the form of data. Here, the communication unit 310 may be a device including hardware and software needed for transmitting and receiving control signals or data signals through a wireless connection with another network device.

The memory 320 performs a function of temporarily or permanently storing data processed by the controller 340. Here, the memory 320 may include a magnetic storage medium or a flash storage medium, but the present disclosure is not limited thereto.

The program storage 330 may store a program composed of commands instructing all processes executed by a controller, which will be described later.

The controller 340 is a type of central processing unit and controls all processes related to issuance of an e-receipt, such as receiving data from the e-receipt generator 200 and providing an e-receipt to the user device 400. In other words, the controller 340 may perform a function of providing an e-receipt by driving control software stored in the program storage 330 and controlling each component in the server 300.

Here, the controller 340 may include all types of devices capable of processing data, such as a processor. Here, the 'processor' may refer to, for example, a data processing device embedded in hardware, having circuitry physically structured to perform functions represented by code or instructions in a program.

The database 350 links an entire address, an identifier included in the address, or other information indicating an address, or other information indicating an identifier to transaction information and store them. Therefore, the server 300 may easily check transaction information through information related to an address.

The e-receipt API 360 provides an interface for converting transaction information into the format of an e-receipt through various applications. The e-receipt API 360 also provides an interface for displaying a generated e-receipt in the form of a web page linked to an address.

These components are merely examples, and the present disclosure is not limited thereto. In other words, as occasions demand, the server 300 may further include additional components or some of the above-stated components may be omitted.

Figure 4:
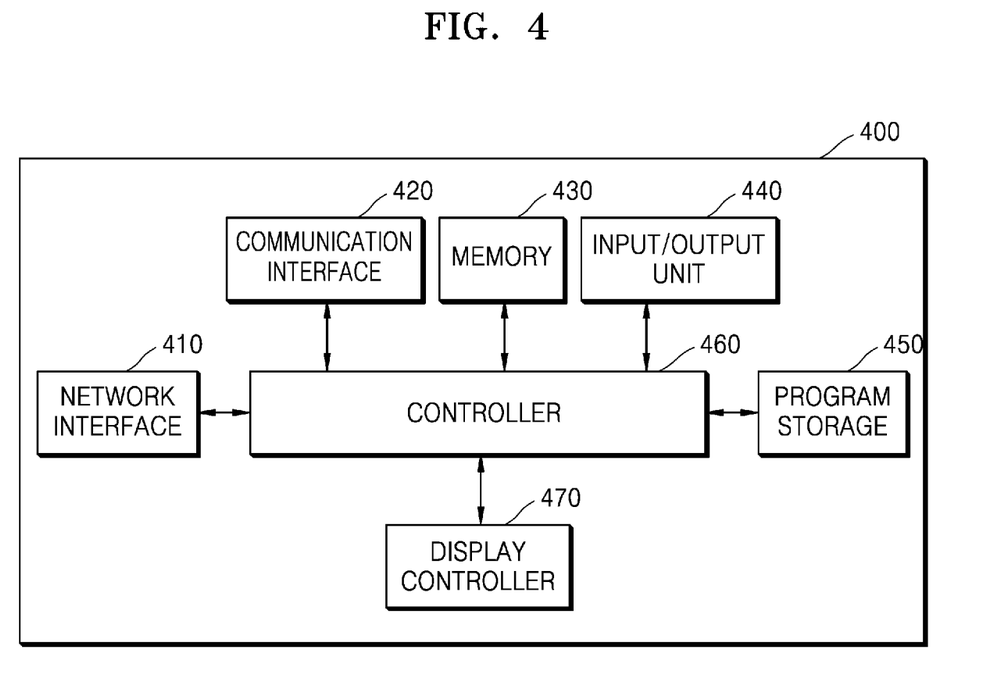
FIG. 4 is a block diagram showing an example of an internal configuration of a user device shown in FIG. 1.

FIG. 4 is a block diagram showing an example of an internal configuration of the user device 400 shown in FIG. 1.

Referring to FIG. 4, the user device 400 includes a network interface 410, a communication interface 420, a memory 430, an input/output unit 440, a program storage 450, a controller 460, and a display controller 470.

The network interface 410 provides an interface needed for receiving an e-receipt in conjunction with a communication network.

The communication interface 420 provides an interface needed for receiving data from the e-receipt generator 200 through near-field wireless communication technologies.

The memory 430 temporarily stores data processed by the controller 460 or temporarily stores an address received from the e-receipt generator 200.

The input/output unit 440 may be configured as a touch-sensitive display controller or other various input/output controllers. For example, the touch-sensitive display controller provides an output interface and an input interface between a device and a user. The touch-sensitive display controller transmits and receives electrical signals to and from the controller 460. Also, the touch-sensitive display controller displays a visual output to a user, and the visual output may include texts, graphics, images, videos, and combinations thereof. The input/output unit 440 may be, for example, a certain display member such as an organic light emitting display (OLED) or liquid crystal display (LCD), capable of recognizing a touch. The input/output unit 440 may display an e-receipt on a web page accessed based on a received address, to be checked by a user.

The program storage 450 stores control software for performing tasks such as a task like receiving a message from the e-receipt generator 200, a task of checking the format of a received message, and, when a received message is an NDEF message, a task of accessing an address included in the NDEF message through a browser as a predetermined action.

The controller 460 is a type of central processing unit and controls all processes related to displaying of an e-receipt in the user device 400. In other words, the controller 460 performs various services such as driving control software stored in the program storage 450.

Figure 5:
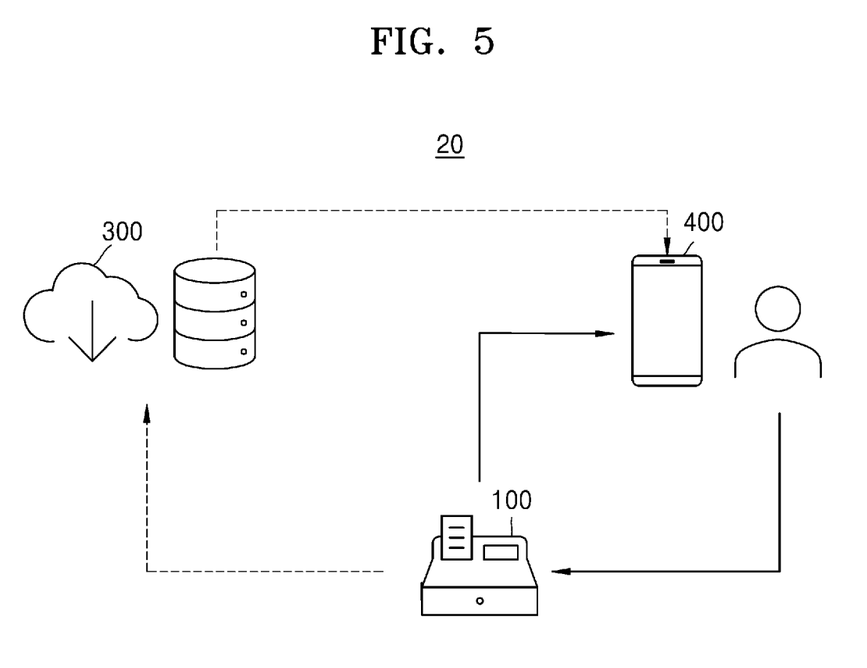
FIG. 5 is a conceptual diagram showing an e-receipt issuing system according to another embodiment of the present invention.

FIG. 5 is a diagram showing an e-receipt issuing system 20 according to another embodiment of the present invention. Referring to FIG. 5, the e-receipt issuing system 20 according to another embodiment of the present disclosure includes a POS terminal 100 including a function of an e-receipt generator, the server 300, and the user device 400.

The e-receipt issuing system 20 of FIG. 5 is mostly similar to the e-receipt issuing system 10 of FIG. 1. However, according to the embodiment of FIG. 5, an e-receipt is not implemented as a separate device, but is implemented in the form of a program recorded on a recording medium that may be read by a POS terminal. Therefore, according to the embodiment of FIG. 5, the POS terminal 100 includes the function as an e-receipt generator.

Figure 6:
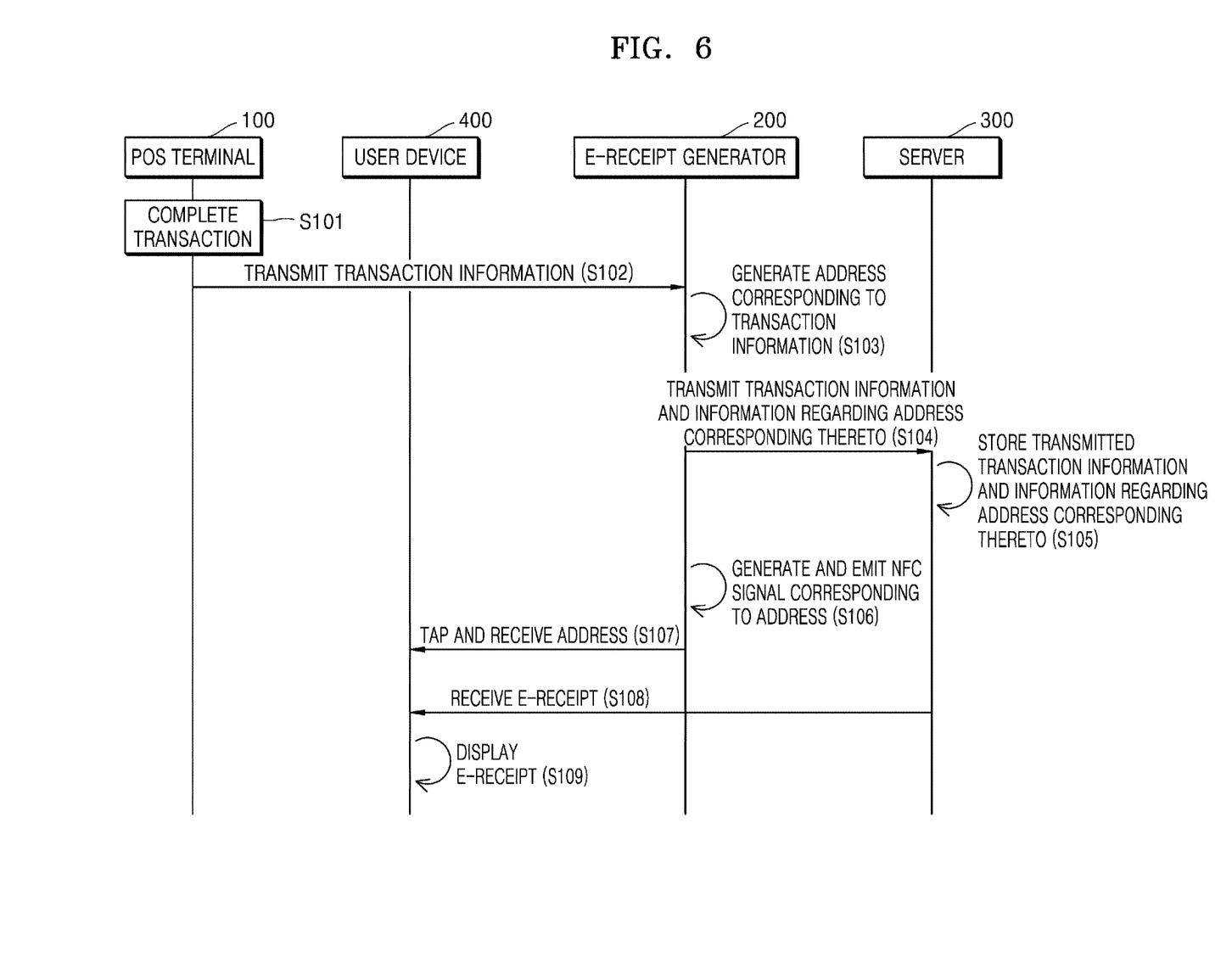
FIG. 6 is a flowchart of a method of issuing an e-receipt according to an embodiment of the present invention.

FIG. 6 is a diagram showing a method of issuing an e-receipt according to an embodiment of the present invention.

Referring to FIG. 6, in operation 101, a user completes a transaction.

Here, completion of a transaction refers to a state in which all items selected by a user are scanned by the POS terminal 100, discounts and purchase points are received as needed, and prices for selected items are paid by using a payment method.

As a transaction is completed, the POS terminal 100 obtains transaction information. Transaction information is a set of all information regarding a transaction for which payment is completed. For example, transaction information may include a date and a time of a transaction, name of goods or a service, a unit price, a quantity, a payment amount, a value-added tax, information regarding a transaction method, a purchase point, a discount amount, a final payment amount with discount, a company name, a business number, name of a chairman, an address, a phone number, etc. However, the present disclosure is not limited thereto.

Transaction information is data in which the above-stated information is recorded in a text file format. For example, the format of transaction information may include a text (TXT) file format, a Rich Text Format (RTF) file format, an Extensible Markup Language XML) file format, a Java Script Object Notation (JSON) file format, a Comma-Separated Values (CSV) file format, and a Tab-Separated Values (TSV) file format. However, the present disclosure is not limited thereto.

In operation 102, the POS terminal 100 transmits transaction information to the e-receipt generator 200.

Referring to FIG. 1, the POS terminal 100 transmits transaction information to the e-receipt generator 200 by a wired communication method or a wireless communication method. According to FIG. 5, since the POS terminal and the e-receipt issuer are integrated with each other, transaction information is transmitted internally.

In operation 103, the e-receipt generator 200 generates an address corresponding to received transaction information.

Here, an address refers to a Uniform Resource Locator (URL) for accessing a web site or a web page on the Internet, but the present disclosure is not limited thereto.

The e-receipt generator 200 generates one unique address corresponding to transaction information. This is because address clashes occur when the same address is generated in response to different transaction information. The e-receipt generator 200 generates a unique address by including a unique identifier corresponding to transaction information in an address. For example, an address may have the format "web address/identifier." Here, the format of the identifier may have various lengths based on a combination of letters, numbers, and special characters, but the present disclosure is not limited thereto.

According to an embodiment, the e-receipt generator 200 may generate an identifier based on contents related to transaction information. For example, an identifier may be generated based on information regarding the e-receipt generator 200 and a date and a time that transaction information is generated. According to another embodiment, the e-receipt generator 200 may generate an identifier using a hash technique. Here, the hash technique refers to a technique for obtaining one result value corresponding to one input value through a hash function. In this case, an identifier may be a result value obtained through the hash technique using transaction information as an input value.

According to an embodiment of the present invention, by using an identifier when generating an address (URL) and transmitting the address to the user device 400 later by using the NFC, the following points are ensured. First, it may be guaranteed to issue one e-receipt to only one user. Also, with respect to the server 300, the address (URL) is guaranteed to be checked only by one user device 400, that is, one user. Therefore, when another user tries to access the same address, the address is no longer functional, and thus personal privacy and security may be maintained.

In operation 104, the e-receipt generator 200 transmits transaction information and information regarding an address corresponding thereto to the server 300.

The e-receipt generator 200 may transmit transaction information, an entire address corresponding thereto, an identifier included in the address, other information indicating an address, and other information indicating an identifier, etc. to the server 300, but the present disclosure is not limited thereto.

In operation 105, the server 300 stores the transaction information and information regarding the address corresponding thereto, which are transmitted from the e-receipt generator 200.

According to operations 104 and 105, the e-receipt generator 200 transmits transaction information and information regarding an address corresponding thereto to the server 300, and the server 300 stores them, and thus a user may use the user device 400 thereafter), you can check an e-receipt with transaction information reflected on a web page just through a link to the address. According to an embodiment of the present invention, since an e-receipt is checked through a browser in the form of a web page, a user does not need to install a particular mobile application on a smartphone to check the e-receipt.

In operation 106, the e-receipt generator 200 generates a near-field wireless communication signal corresponding to the address.

The e-receipt generator 200 transmits information to the user device 400 through the NFC. According to an embodiment, the e-receipt generator 200 generates and emits a message in a particular format used for near-field wireless communication. Here, the particular format refers to a format that enables the user device 400 receiving a corresponding message to immediately perform a predetermined action. For example, the e-receipt generator 200 generates and emits an NDEF message. An NDEF message includes information to be transmitted to the user device 400. Here, as a payload, an address is included in the NDEF message. Thereafter, the user device 400 performs a predetermined operation by receiving the NDEF message. Here, the predetermined operation may be to open a web page, which is linked to an address, through a browser.

Although FIG. 6 shows that operation 106 occurs after operation 105, the present disclosure is not limited thereto. For example, operation 105 and operation 106 may occur simultaneously or operation 105 may occur after operation 106.

In operation 107, the user device 400 receives the address by tapping the e-receipt generator 200.

The user device 400 receives information from the e-receipt generator 200 through near-field wireless communication. The user device 400 may include a device, an application, an application, or an application programming interface that supports or helps to support the NFC function. According to an embodiment, the user device 400 receives an NDEF message including the address as a payload by approaching the e-receipt generator 200 within dozens of centimeters (cm).

According to operation 107, as the e-receipt generator 200 transmits the address to the user device 400 through near-field wireless communication, the user device 400 is capable of obtaining information regarding an e-receipt through a simple and quick action of tapping the e-receipt machine 200, and it is not necessary to input personal information to the POS terminal 100 to obtain the e-receipt.

In operations 108 and 109, the user device 400 accesses a designated web page based on a received address and displays an e-receipt.

The user device 400 accesses a web page on the Internet linked to the received address. The user device 400 receives the address through the NDEF message and automatically accesses a web page linked to the address as a predetermined action. The server 300 already stores transaction information corresponding to the address. The server 300 converts the transaction information into an e-receipt format through an application to be described later. The server 300 displays a generated e-receipt in the form of a web page linked to the address. Therefore, the user device 400 may check the e-receipt by accessing the web page linked to the address.

An e-receipt may be generated by various types of applications, such as a Progressive Web App, a Responsive Web App, a Rich Internet App, a Single Page App, or a Multi Page App, but the present disclosure is not limited thereto.

An e-receipt is a type of electronic document in which transaction information is displayed based on a set of rules according to a format determined by a provider. Here, the provider refers to the entity responsible for sale of goods or provision of services in a transaction. For example, the provider may be a merchant or a retailer. However, the present disclosure is not limited thereto, and the provider is a concept distinct from a consumer, a user, or a customer mentioned in the present invention.

Figure 7:
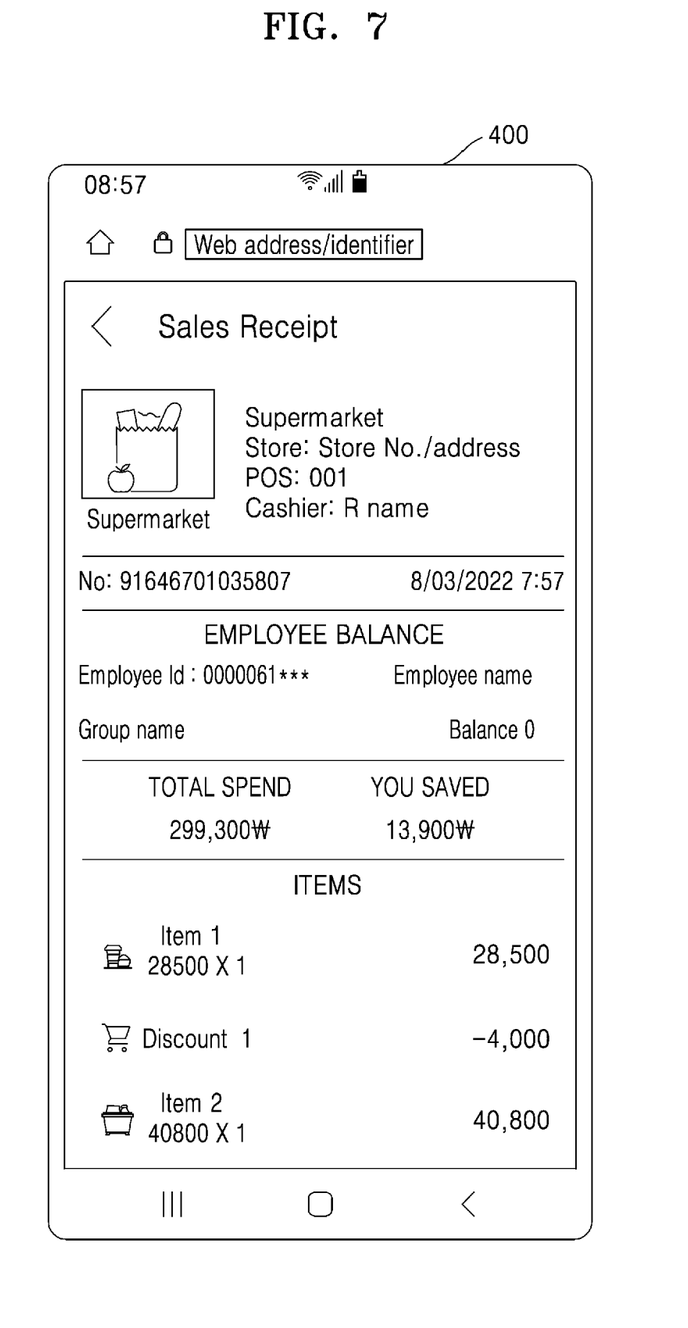
FIG. 7 is a diagram showing an example in which an e-receipt is displayed on a smartphone, according to an embodiment of the present invention.

FIG. 7 is a diagram showing an example of an e-receipt according to an embodiment of the present invention.

As shown in FIG. 7, an e-receipt may be displayed in the form of a web page through a browser. The e-receipt may include a date and a time of a transaction, name of goods or a service, a unit price, a quantity, a payment amount, a value-added tax, name of a credit card, a receipt authorization number, a company name, a business number, name of a chairman, an address, a phone number, etc. The format of an e-receipt may be determined by a provider and is not limited to that shown in the drawings.

According to an embodiment of the present invention, a consumer may check an e-receipt without installing a particular application on a smartphone. Conventionally, in the case of issuing an e-receipt through a particular application, a particular application needs to be installed on a consumer's smartphone and it is necessary to log-in. However, since an e-receipt according to the present disclosure may be checked in the form of a web page through a browser, a consumer does not need to install a separate application, sign up for a website, or log in to receive an e-receipt.

According to an embodiment of the present invention, a consumer may check an e-receipt on his/her smartphone with a simple action of tapping an e-receipt provider. Since a URL is transmitted to a smartphone through an NDEF message according to the present invention, the smartphone directly executes the URL by a command pre-set in the NDEF message. Therefore, a consumer may check the e-receipt through a browser only with a tapping action without a further action.

According to an embodiment of the present invention, a consumer may be provided with an e-receipt through his/her smartphone without providing personal information such as an e-mail or a phone number to a business operator. In other words, according to the present invention, unnecessary leakage of personal information during a payment transaction process may be prevented, the procedure and the time until issuance of a receipt may be shortened, and an e-receipt may be more conveniently checked on one's smartphone.

According to an embodiment of the present invention, a consumer may be provided with an e-receipt through his/her smartphone regardless of a transaction means. Conventionally, when a credit card company issues an e-receipt, the e-receipt may be received only when payment is made by using a credit card of the corresponding credit card company. However, according to the present invention, since an e-receipt is issued to a consumer's smartphone in conjunction with a POS terminal of a business operator, the consumer may receive an e-receipt regardless of a payment method, such as cash, a debit card, a credit card, a mobile payment, or a simple payment.

According to an embodiment of the present invention, a consumer may be provided with an e-receipt including all of a series of information related to a transaction. Conventionally, when an e-receipt is issued through a related application or a short message service (SMS) after performing a card payment, a mobile payment, or a simple payment, only limited information related to a transaction is displayed on the e-receipt. For example, in this case, only a total amount of payment is displayed, and detailed items related to a transaction (details of items of a transaction, quantities of items, a price of each item, tax, etc.) are not displayed. However, according to a method of issuing an e-receipt according to the present invention, a consumer may be provided with an e-receipt including all information related to a transaction.

Figure 8:
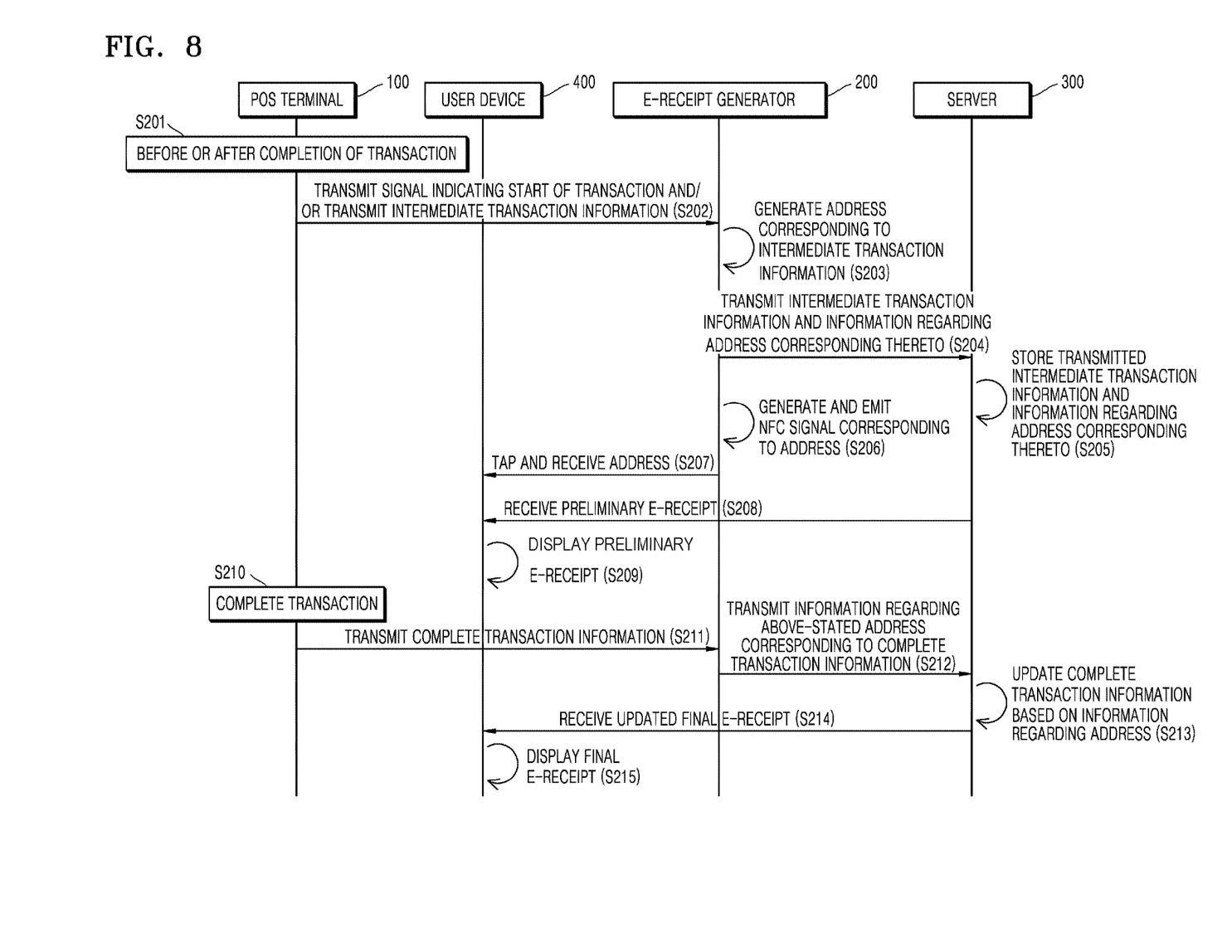
FIG. 8 is a flowchart of a method of issuing an e-receipt according to another embodiment of the present invention.

FIG. 8 is a diagram showing a method of issuing an e-receipt according to another embodiment of the present invention.

Referring to FIG. 8, in operation 201, a user is before starting a transaction or started at least a part of a transaction.

Unlike in FIG. 6, the user's transaction is not yet completed in operation 201. In operation 201, it is before the user makes a payment for a selected goods by using a payment method. For example, operation 201 may correspond to a time point before the user scans a first item to a POS terminal for checkout, a time point at which the user scanned at least one item to the POS terminal for checkout, or a time point at which, although the user scanned all items to the POS terminal, a payment is not yet completed.

In operation 202, the POS terminal 100 transmits transaction information to the e-receipt generator 200.

Referring to FIG. 1, the POS terminal 100 transmits intermediate transaction information to the e-receipt generator 200 by a wired communication method or a wireless communication method. According to FIG. 5, since the POS terminal and the e-receipt issuer are integrated with each other, transaction information is transmitted internally.

Here, the intermediate transaction information is distinguished from completed transaction information, which will be described later. The intermediate transaction information is a set of all information regarding a transaction for which payment is not completed. For example, the intermediate transaction information may include a date and a time of a transaction, the name of goods or a service, a unit price, a quantity, a subtotal amount, a business name, a business number, name of a chairman, an an address, a phone number, etc. However, the intermediate transaction information does not include a total amount, information regarding a payment method, a purchase point amount to be accumulated, a discount amount, and a final payment amount that reflects the discount.

Temporary transaction information is data stored in a certain format. For example, the preliminary transaction information may be data in which the above-stated information is recorded in a text file format, but is not limited thereto.

In operation 203, the e-receipt generator 200 generates an address corresponding to received intermediate transaction information.

Here, an address refers to a Uniform Resource Locator (URL) for accessing a web site or a web page on the Internet, but the present disclosure is not limited thereto.

The e-receipt generator 200 generates one unique address corresponding to intermediate transaction information. This is because address clashes occur when the same address is generated in response to different transaction information. The e-receipt generator 200 generates a unique address by including a unique identifier corresponding to intermediate transaction information in an address. For example, an address may have the form (format?) "web address/identifier." Here, the form (format?) of the identifier may have various lengths based on a combination of letters, numbers, and special characters, but the present disclosure is not limited thereto.

According to an embodiment, the e-receipt generator 200 may generate an identifier based on contents related to intermediate transaction information. For example, an identifier may be generated based on information regarding the e-receipt generator 200 and a date and a time that transaction information is generated. According to another embodiment, the e-receipt generator 200 may generate an identifier using a hash technique. Here, the hash technique refers to a technique for obtaining one result value corresponding to one input value through a hash function. In this case, an identifier may be a result value obtained through the hash technique using intermediate transaction information as an input value.

In operation 204, the e-receipt generator 200 transmits intermediate transaction information and information regarding an address corresponding thereto to the server 300.

The e-receipt generator 200 may transmit intermediate transaction information, an entire address corresponding thereto, an identifier included in the address, other information indicating an address, and other information indicating an identifier, etc. to the server 300, but the present disclosure is not limited thereto.

In operation 205, the server 300 stores the intermediate transaction information and information regarding the address corresponding thereto, which are transmitted from the e-receipt generator 200.

In operation 206, the e-receipt generator 200 generates a near-field wireless communication signal corresponding to the address.

The e-receipt generator 200 transmits information to the user device 400 through the NFC. According to an embodiment, the e-receipt generator 200 generates and emits a message in a particular format used for near-field wireless communication. Here, the particular format refers to a format that enables the user device 400 receiving a corresponding message to immediately perform a predetermined action. For example, the e-receipt generator 200 generates and emits an NDEF message. An NDEF message includes information to be transmitted to the user device 400. Here, as a payload, an address is included in the NDEF message. Thereafter, the user device 400 performs a predetermined operation by receiving the NDEF message.

Although FIG. 8 shows that operation 206 occurs after operation 205, the present disclosure is not limited thereto. For example, operation 205 and operation 206 may occur simultaneously or operation 205 may occur after operation 206.

In operation 207, the user device 400 receives the address by tapping the e-receipt generator 200.

The user device 400 receives information from the e-receipt generator 200 through near-field wireless communication. The user device 400 may include a device, an application, an application, or an application programming interface that supports or helps to support the NFC function. According to an embodiment, the user device 400 receives an NDEF message including the address as a payload by approaching the e-receipt generator 200 within dozens of cm.

In operations 208 and 209, the user device 400 accesses a designated web page based on a received address and displays a preliminary e-receipt.

The user device 400 accesses a web page on the Internet linked to the received address. The server 300 already stores intermediate transaction information corresponding to the address. The server 300 converts the intermediate transaction information into a preliminary e-receipt format through an application. The server 300 displays a generated preliminary e-receipt in the form of a web page linked to the address. Therefore, the user device 400 may check the preliminary e-receipt by accessing the web page linked to the address.

A preliminary e-receipt may be generated by various types of applications, such as a Progressive Web App, a Responsive Web App, a Rich Internet App, a Single Page App, or a Multi Page App, but the present disclosure is not limited thereto.

Figure 9:
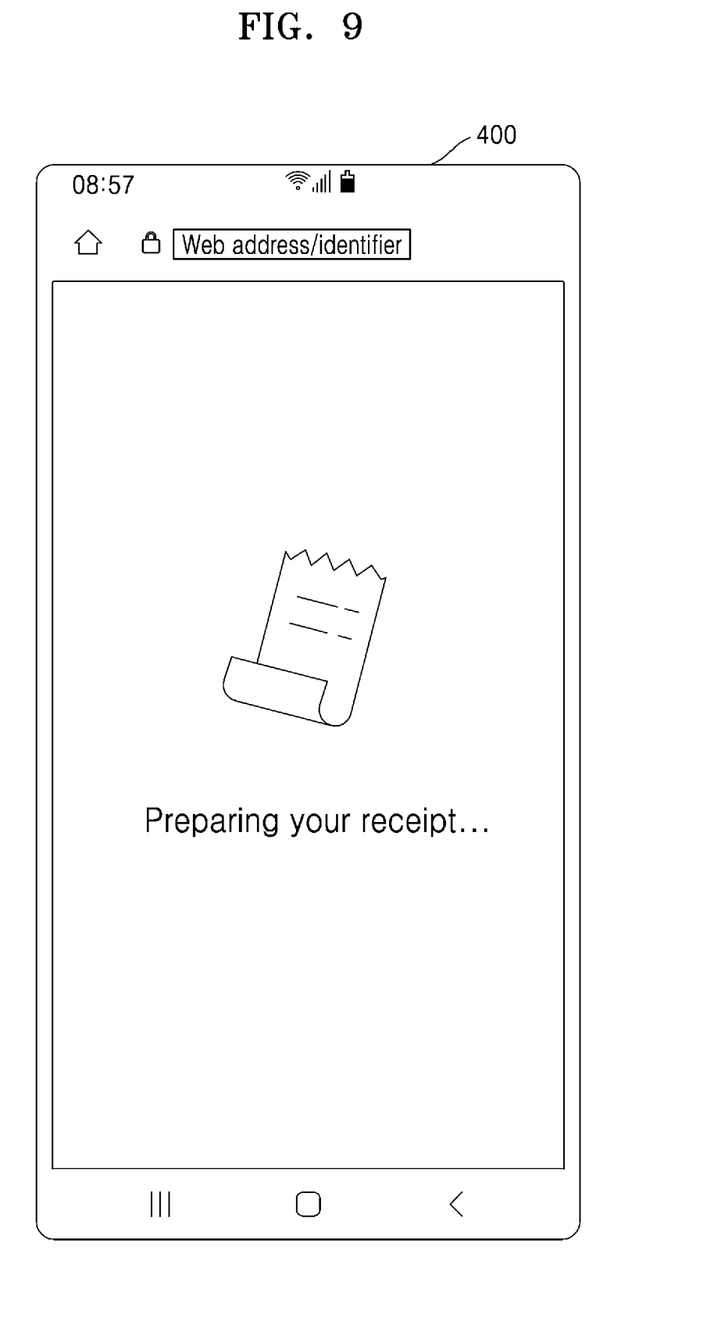
FIG. 9 is a diagram showing an example in which a waiting room is displayed on a smartphone according to an embodiment of the present invention.

According to an optional embodiment, as shown in FIG. 9, the user device 400 may not display a preliminary e-receipt and may display a message "preparing your e-receipt."

In operation 210, the user completes the transaction. As the transaction is completed, the POS terminal 100 obtains completed transaction information. According to an embodiment, the completed transaction information is a set of all information regarding a transaction for which payment is completed.

According to an embodiment, the completed transaction information may include a final payment amount, a final value-added tax, and information regarding a payment method in addition on a date and a time of a transaction, the name of goods or a service, a unit price, a quantity, a business name, a business number, name of a chairman, an an address, a phone number, etc.

According to another embodiment, the completed transaction information may include all information regarding a transaction in which a payment is completed after a membership discount benefit or an accumulated purchase point benefit is reflected. In this case, the completed transaction information may include membership information, purchase point accumulation information, purchase point accumulation amount, discount information, a discount amount, a final payment amount in which the discount is reflected, etc. in addition to the above-stated information.

Similar to preliminary transaction information, completed transaction information is data stored in a certain format. For example, completed transaction information is data in which the above-stated information is recorded in a text file format.

In operation 211, the POS terminal 100 transmits completed transaction information to the e-receipt generator 200.

Referring to FIG. 1, the POS terminal 100 transmits transaction information to the e-receipt generator 200 by a wired communication method or a wireless communication method. According to FIG. 5, since the POS terminal and the e-receipt issuer are integrated with each other, transaction information is transmitted internally.

In operation 212, the e-receipt generator 200 transmits completed transaction information and information regarding an address corresponding thereto to the server 300.

The e-receipt generator 200 already has intermediate transaction information and an address corresponding thereto. The intermediate transaction information will be replaced or updated by the completed transaction information. Therefore, the e-receipt generator 200 uses an address corresponding to the intermediate transaction information as an address corresponding to the completed transaction information. Therefore, in this case, address clashes will not occur. The e-receipt generator 200 may transmit completed transaction information, an entire address already stored therein, an identifier included in the address, other information indicating an address, and other information indicating an identifier, etc. to the server 300, but the present disclosure is not limited thereto.

In operation 213, the server 300 updates the intermediate transaction information to completed transaction information through information regarding an address transmitted from the e-receipt generator 200.

In operations 214 and 215, the user device 400 accesses a designated web page based on a received address and displays an updated e-receipt.

The user device 400 accesses a web page on the Internet linked to the received address. The server 300 already stores updated completed transaction information corresponding to the address. The server 300 converts the completed transaction information into an e-receipt format through an application. The server 300 displays a generated updated e-receipt in the form of a web page linked to the address. Therefore, the user device 400 may check the updated e-receipt by accessing the web page linked to the address.

An updated e-receipt may be generated by various types of applications, such as a Progressive Web App, a Responsive Web App, a Rich Internet App, a Single Page App, or a Multi Page App, but the present disclosure is not limited thereto.

According to the method of providing an e-receipt shown in FIG. 6, a user may check an e-receipt by tapping a smartphone to an e-receipt generator after a transaction is completed. In contrast, in the method of providing an e-receipt shown in FIG. 8, even before a transaction is completed, a user may receive an address of a related web page by tapping a smartphone to an e-receipt generator, and, after the transaction is completed, the final e-receipt is automatically updated to allow the user to check the updated e-receipt.

A method of issuing an e-receipt according to another embodiment of the present disclosure is mostly similar to the methods of FIGS. 6 and 8. Only differences from the methods of FIGS. 6 and 8 will be described.

In operation 103 of FIG. 6 and operation 203 of FIG. 8, the e-receipt generator 200 generates an address corresponding to received transaction information. Here, an address refers to a Uniform Resource Locator (URL) for accessing a web site or a web page on the Internet.

However, according to the method of issuing an e-receipt according to another embodiment, the address here refers to a deep link URL for directly accessing to a mobile application page or a web application page.

A deep link URL may be directly generated in response to transaction information. However, the present disclosure is not limited thereto, and the e-receipt generator 200 may first generate a URL in response to transaction information and then derive a deep link URL therefrom.

Meanwhile, in operations 108 and 109 of FIG. 6 and operations 214 and 215 of FIG. 8, the user device 400 accesses a designated web page based on a received address and displays an e-receipt.

However, according to the method of issuing an e-receipt according to another embodiment, since an address is a deep link URL, the user device 400 directly accesses a designated mobile application page or a designated web application page based on a received address and displays an e-receipt.

in detail, the user device 400 executes an application and accesses a mobile application page or a web application page linked to a received address. The user device 400 receives an address through an NDEF message and, as a predetermined action, executes a related application and accesses a page linked to the address.

According to an optional embodiment, when a related application is not installed on the user device 400, the user device 400 installs a necessary application and then accesses a mobile application page or a web application page linked to the address. Even in this case, the user device 400 receives an address through an NDEF message and, as a predetermined action, executes an action for installing a necessary application and accesses a page linked to the address.

In addition, unless explicitly described to the contrary, the word "comprise" and variations such as "comprises" or "comprising" will be understood to imply the inclusion of stated elements but not the exclusion of any other elements. In this specification, a "unit" may be a hardware component such as a processor or a circuit, and/or software component executed on the hardware like a processor.

On the other hand, according to embodiments of the present invention, each of components, functional blocks, or means may include one or more sub-components, and electrical, electronic, and mechanical functions performed by the components may be implemented by various well-known devices or mechanical elements, such as electronic circuits, integrated circuits, application specific integrated circuits (ASICs), etc. and may be implemented separately from one another or integrally implemented in combination of two or more thereof.

Also, combinations of blocks in the accompanying block diagrams and operations in the flowcharts may be performed by computer program instructions. These computer program instructions may be loaded into a processor of a general purpose computer, a special purpose computer, a portable laptop computer, a network computer, a mobile device such as a smartphone, or other programmable data processing equipment, and thus the instructions executed by a processor of a computer device or other programmable data processing equipment generates means for performing functions described in each block of the block diagrams to be described below or in each operations of the flowcharts. These computer program instructions may also be stored in a computer-applicable memory or a computer-readable memory that may be used to a computer device or other programmable data processing equipment to implement a function in a particular manner, and thus a product including instructions means for performing functions described in blocks of the block diagrams or operations of the flowcharts may be manufactured. Since computer program instructions may also be stored on a computer device or other programmable data processing equipment, operations for generating a process for performing a series of operations on a computer device or other programmable data processing equipment and executing functions described in blocks of the block diagrams and operations of the flowcharts may be provided.

Also, each block or each operation may represent a module, a segment, or a portion of code including one or more executable instructions for executing specified logical function(s). It should also be noted that, according to some alternative embodiments, functions stated in blocks or operations may occur in different orders. For example, two blocks or operations shown one after another may in fact be performed substantially simultaneously or the blocks or the operations may sometimes be performed in the reverse order according to a corresponding function.

Although aspects of the present disclosure are described with reference to the embodiments illustrated in the accompanying drawings, they are merely examples, and one of ordinary skill in the art will understand that various modifications and other equivalent embodiments may be derived therefrom. Accordingly, the true scope of the present disclosure should be determined only by the appended claims.

INDUSTRIAL APPLICABILITY

The present disclosure provides a method of issuing electronic receipts, such that a user may conveniently check the same on a smartphone, and thus a business operator may use the method.

The invention claimed is:

1. A method of issuing an electronic receipt, the method comprising:
before a final transaction is completed, transmitting, by a point of sale (POS) terminal to an electronic receipt generator, preliminary transaction information related to a preliminary transaction of the final transaction;
receiving, by the electronic receipt generator, the preliminary transaction information;
generating, by the electronic receipt generator, a unique transaction identifier in response to the receiving the preliminary transaction information, wherein the unique transaction identifier is generated by using a hash technique on the preliminary transaction information;
generating, by the electronic receipt generator, an address including the unique transaction identifier in order to transmit the preliminary transaction information and information regarding the address to a server, wherein the address is a Uniform Resource Locator (URL);
receiving and storing, by the server, the preliminary transaction information and the information regarding the address;
generating and emitting, by the electronic receipt generator, a near-field wireless communication signal comprising a near-field communication (NFC) data exchange format (NDEF) message comprising the address as a payload;
receiving, by the user device, the address through the emitted near-field wireless communication signal;
accessing, by a user device, the URL;
generating, by the server, a preliminary electronic receipt generated based on the preliminary transaction information and displayable through a web page corresponding to the address;
in response to the accessing, displaying, by the user device, the preliminary electronic receipt through the web page corresponding to the address, without requiring input of personal information or an execution by the user device of an application, wherein the personal information includes an e-mail or a phone number;
after the final transaction is completed, updating, by the electronic receipt generator, the preliminary transaction information and the address with completed transaction information;
receiving, by the server, the completed transaction information and updated information regarding the address;
generating, by the server, a final electronic receipt generated based on the completed transaction information and displayable through the web page corresponding to the address; and
displaying, by the user device, the final electronic receipt through the web page of the address;
wherein the electronic receipt generator comprises:
a network interface configured to transmit the preliminary transaction information and the information regarding the address to the server in conjunction with a communication network,
a communication interface configured to receive the preliminary transaction information from the POS terminal in conjunction with a communication system,
a memory for storing the preliminary transaction information,
an address generator configured to generate the unique transaction identifier in response to the receiving the preliminary transaction information and generate the address including the unique transaction identifier, and
an NFC tag controller configured to generate and emit the NDEF message;
wherein the server comprises:
a communication unit configured to provide an interface needed to provide signals transmitted and received between the user device and the electronic receipt generator in a form of data,
a database for storing the preliminary transaction information and the information regarding the address received from the electronic receipt generator, and
a controller configured to:
store the preliminary transaction information in the database and the information regarding the address,
execute an electronic receipt application programming interface configured to generate the preliminary electronic receipt from the preliminary transaction information, provide the web page for displaying the preliminary electronic receipt corresponding to the address,
receive the completed transaction information and the updated information regarding the address, and
provide the web page corresponding to the address for displaying the final electronic receipt.

\* \* \* \* \*

UNITED STATES PATENT AND TRADEMARK OFFICE
CERTIFICATE OF CORRECTION

| | |
|---|---|
| PATENT NO. | : 12,067,552 B2 |
| APPLICATION NO. | : 18/001390 |
| DATED | : August 20, 2024 |
| INVENTOR(S) | : Lim |

Page 1 of 1

It is certified that error appears in the above-identified patent and that said Letters Patent is hereby corrected as shown below:

In the Specification

In Column 5, Line 27, after "information" insert -- to --.

In Column 11, Line 16, delete "an an" and insert -- an --, therefor.

In Column 13, Lines 3-4, delete "an an" and insert -- an --, therefor.

Signed and Sealed this
Twenty-sixth Day of November, 2024

Katherine Kelly Vidal
*Director of the United States Patent and Trademark Office*